US008141924B2

(12) United States Patent
Albin

(10) Patent No.: US 8,141,924 B2
(45) Date of Patent: Mar. 27, 2012

(54) GRIPPER SYSTEM

(75) Inventor: Scott R. Albin, Carlisle, MA (US)

(73) Assignee: Foster-Miller, Inc., Waltham, MA (US)

( * ) Notice: Subject to any disclaimer, the term of this patent is extended or adjusted under 35 U.S.C. 154(b) by 379 days.

(21) Appl. No.: 12/317,740

(22) Filed: Dec. 29, 2008

(65) Prior Publication Data

US 2010/0164243 A1 Jul. 1, 2010

(51) Int. Cl.
 *B25J 15/08* (2006.01)
(52) U.S. Cl. .......................... 294/106; 294/902
(58) Field of Classification Search .............. 294/106, 294/902, 213; 901/38, 39; 269/268, 270
 See application file for complete search history.

(56) References Cited

U.S. PATENT DOCUMENTS

| | | | |
|---|---|---|---|
| 429,903 A | 6/1890 | Gregg | |
| 816,236 A | 3/1906 | Kline | |
| 832,541 A | 10/1906 | Dodge | |
| 1,350,124 A | 8/1920 | Venable | |
| 1,479,310 A | 1/1924 | Monroe | |
| 2,132,795 A | 10/1938 | Minier | |
| 2,221,192 A | 11/1940 | Juhl | |
| 2,594,763 A | 4/1952 | Freyer | |
| 2,613,100 A * | 10/1952 | Casey, Jr. ................ 294/115 | |
| 2,617,203 A | 11/1952 | Murray | |
| 2,617,211 A | 11/1952 | Olson | |
| 2,665,434 A | 1/1954 | Saunders | |
| 2,710,765 A | 6/1955 | Arens | |
| 2,891,813 A | 6/1959 | Inaki | |
| 2,926,865 A | 3/1960 | Humphreys | |
| 3,042,440 A | 7/1962 | Weil, Sr. et al. | |
| 3,108,498 A | 10/1963 | James et al. | |
| 3,202,449 A * | 8/1965 | Lemelson ................ 294/88 | |
| 3,247,979 A | 4/1966 | Melton et al. | |
| 3,370,213 A | 2/1968 | Rose | |
| RE26,904 E | 6/1970 | Lemelson | |
| 3,558,177 A | 1/1971 | Snead et al. | |
| 3,645,578 A | 2/1972 | Renfroe | |
| 3,765,347 A | 10/1973 | Tormstrom | |
| 3,866,966 A * | 2/1975 | Skinner, II ................ 294/106 | |
| 3,914,884 A | 10/1975 | Guinot | |
| 3,920,137 A | 11/1975 | McCain | |
| 3,952,880 A | 4/1976 | Hill et al. | |
| 4,000,784 A | 1/1977 | Morrow, Sr. et al. | |
| 4,062,455 A | 12/1977 | Flatau | |

(Continued)

FOREIGN PATENT DOCUMENTS

EP 24751 A1 3/1981

(Continued)

*Primary Examiner* — Dean Kramer

(74) *Attorney, Agent, or Firm* — Iandiorio Teska & Coleman, LLP

(57) ABSTRACT

A gripper system having a pair of jaws operable in a first plane and having a central closure axis; each jaw including a finger member and finger tip member disposed on its distal end; and a gripper drive assembly for moving the jaws toward and away from each other; each finger member having a shaped inner contour for accommodating an object to be gripped; each finger tip member including an inner surface which generally aligns with the shaped inner contour for gripping a range of larger objects and an outer surface which generally aligns with the gripper central closure axis upon closure for gripping a range of smaller objects. Alternatively, each finger tip member may include a forcep element extending transversely to said plane.

19 Claims, 11 Drawing Sheets

U.S. PATENT DOCUMENTS

| | | | |
|---|---|---|---|
| 4,097,084 A * | 6/1978 | Russell | 294/104 |
| 4,114,464 A * | 9/1978 | Schubert et al. | 74/89.14 |
| 4,281,866 A | 8/1981 | Atcheson | |
| 4,367,893 A * | 1/1983 | Berg | 294/106 |
| 4,370,091 A | 1/1983 | Gagliardi | |
| 4,456,293 A | 6/1984 | Panissidi | |
| 4,478,451 A * | 10/1984 | Brucher et al. | 294/106 |
| 4,489,969 A | 12/1984 | Merry | |
| 4,494,441 A | 1/1985 | Magnuson | |
| 4,501,522 A | 2/1985 | Causer et al. | |
| 4,512,524 A * | 4/1985 | Shigemizu | 241/101.73 |
| 4,600,355 A | 7/1986 | Johnson | |
| 4,600,357 A * | 7/1986 | Coules | 414/730 |
| 4,621,562 A | 11/1986 | Carr et al. | |
| D287,218 S | 12/1986 | Portz | |
| 4,645,409 A | 2/1987 | Gorman | |
| 4,648,464 A | 3/1987 | Huxley | |
| 4,678,220 A | 7/1987 | Gabriel | |
| 4,697,838 A | 10/1987 | Hartman | |
| 4,699,414 A | 10/1987 | Jones | |
| 4,709,265 A | 11/1987 | Silverman et al. | |
| 4,738,576 A | 4/1988 | Eberle et al. | |
| 4,766,775 A | 8/1988 | Hodge | |
| 4,773,298 A | 9/1988 | Tischer et al. | |
| 4,778,211 A | 10/1988 | Gabriel | |
| 4,784,422 A * | 11/1988 | Jones et al. | 294/106 |
| 4,810,019 A * | 3/1989 | Brucher | 294/106 |
| 4,822,233 A | 4/1989 | Hansel | |
| 4,822,238 A | 4/1989 | Kwech | |
| 4,865,400 A | 9/1989 | Caron et al. | |
| 4,932,831 A | 6/1990 | White et al. | |
| 4,941,416 A | 7/1990 | Faulring | |
| 4,993,914 A * | 2/1991 | Riddle | 414/738 |
| 5,024,397 A | 6/1991 | Edwards et al. | |
| 5,033,785 A * | 7/1991 | Woolley, Jr. | 294/104 |
| 5,060,378 A | 10/1991 | LaBounty et al. | |
| 5,063,628 A | 11/1991 | Campbell | |
| 5,081,941 A | 1/1992 | Weeks | |
| 5,098,024 A | 3/1992 | MacIntyre et al. | |
| 5,195,388 A | 3/1993 | Zona et al. | |
| 5,222,409 A | 6/1993 | Dalakian | |
| 5,360,071 A | 11/1994 | Bergendorf | |
| 5,385,311 A | 1/1995 | Morikawa et al. | |
| 5,427,424 A | 6/1995 | Robinson | |
| 5,435,405 A | 7/1995 | Schempf et al. | |
| 5,440,916 A | 8/1995 | Stone et al. | |
| 5,443,354 A | 8/1995 | Stone et al. | |
| 5,474,242 A | 12/1995 | Rafn | |
| 5,485,691 A | 1/1996 | Stevens et al. | |
| 5,570,992 A | 11/1996 | Lemelson | |
| 5,600,904 A | 2/1997 | Bowling | |
| 5,672,044 A | 9/1997 | Lemelson | |
| 5,769,341 A | 6/1998 | Morikawa et al. | |
| 5,842,427 A | 12/1998 | Hunter et al. | |
| 5,872,892 A | 2/1999 | Brown et al. | |
| 5,921,302 A | 7/1999 | Petersen | |
| 6,113,343 A | 9/2000 | Goldenberg et al. | |
| 6,217,094 B1 | 4/2001 | Hanaduka et al. | |
| 6,236,906 B1 | 5/2001 | Müller | |
| 6,283,220 B1 | 9/2001 | Carter | |
| 6,338,512 B1 | 1/2002 | Ruppert et al. | |
| 6,341,568 B1 | 1/2002 | Culley | |
| 6,341,933 B1 | 1/2002 | Gagnon et al. | |
| 6,377,872 B1 | 4/2002 | Struckman | |
| 6,431,296 B1 | 8/2002 | Won | |
| 6,491,127 B1 | 12/2002 | Holmberg et al. | |
| 6,508,496 B1 | 1/2003 | Huang | |
| 6,523,284 B1 | 2/2003 | Clugston | |
| 6,526,678 B2 | 3/2003 | Waddington, Jr. | |
| 6,615,753 B1 | 9/2003 | Culley | |
| 6,702,050 B1 | 3/2004 | Mazhar | |
| 6,722,296 B2 | 4/2004 | Reilly | |
| 6,766,973 B2 | 7/2004 | Muri | |
| 6,842,674 B2 | 1/2005 | Solomon | |
| 6,904,976 B1 | 6/2005 | Zach et al. | |
| 6,999,849 B2 | 2/2006 | Bridges | |
| 7,104,576 B1 | 9/2006 | Dorr | |
| 2004/0006824 A1 | 1/2004 | Huang | |
| 2004/0030448 A1 | 2/2004 | Solomon | |
| 2004/0030450 A1 | 2/2004 | Solomon | |
| 2004/0030451 A1 | 2/2004 | Solomon | |
| 2004/0030570 A1 | 2/2004 | Solomon | |
| 2004/0068416 A1 | 4/2004 | Solomon | |
| 2004/0134336 A1 | 7/2004 | Solomon | |
| 2005/0204850 A1 | 9/2005 | Nihei et al. | |
| 2006/0156852 A1 | 7/2006 | Haniya | |
| 2006/0192515 A1 | 8/2006 | Takayama et al. | |
| 2006/0283054 A1 | 12/2006 | Crow | |
| 2006/0289178 A1 | 12/2006 | Basek | |
| 2007/0097382 A1 | 5/2007 | Granger | |
| 2007/0107917 A1 | 5/2007 | Doherty et al. | |
| 2008/0073922 A1 | 3/2008 | Holtz | |
| 2008/0083344 A1 | 4/2008 | Deguire et al. | |
| 2008/0296920 A1 | 12/2008 | Kipping et al. | |
| 2009/0071281 A1 | 3/2009 | Fisk et al. | |
| 2009/0129003 A1 | 5/2009 | Bruck et al. | |
| 2009/0164045 A1 | 6/2009 | Deguire et al. | |
| 2010/0095799 A1 | 4/2010 | Albin et al. | |
| 2010/0101356 A1 | 4/2010 | Albin | |
| 2010/0158656 A1 | 6/2010 | Seavey | |
| 2010/0164243 A1 | 7/2010 | Albin | |

FOREIGN PATENT DOCUMENTS

| | | |
|---|---|---|
| WO | WO 2004003680 | 1/2004 |
| WO | WO 2007088206 | 8/2007 |

* cited by examiner

GRIPPER SYSTEM

FIELD OF THE INVENTION

This invention relates to an improved gripper system for gripping a large range of objects and for gripping in confined spaces and adapted for use in mobile robots.

BACKGROUND OF THE INVENTION

Mobile, remotely controlled robots are becoming increasingly popular for use by the military, SWAT units, and police and fire departments. The applicants' TALON® robot, for example, includes an arm with an end effecter, several cameras, several antennas, and a deployable mast. Frequently the end effector is a gripper, e.g. a pair of jaws that can be opened and closed on command to grasp objects such as debris, hazardous material, unexploded ordinance and the like. The larger robots even have the capability to grip an injured, downed, person by some personal paraphernalia such as a shirt collar and drag them out of harm's way to safety. End effector grippers generally are designed to grasp objects within a defined size range. To grip objects larger or smaller than that size range, the present grippers must be removed and replaced with a gripper that has the desired size range capability. This requires an interruption in the availability of the mobile robot and can be dangerous and even life threatening in the circumstances in which these robots are frequently used. Another problem often encountered is the difficulty in using the grippers to reach into confined spaces and or grip very small objects such as, for example, a single wire in a bundle or inside a housing. Often this requires tipping the end of the gripper downwardly, often involving the arm, about the pitch axis of the jaws to gain access to the confined space and/or grip a wire.

SUMMARY OF THE INVENTION

It is therefore an object of this invention to provide an improved gripper system.

It is a further object of this invention to provide such an improved gripper system particularly suited for mobile robots.

It is a further object of this invention to provide such an improved gripper system which is compliant and able to accommodate a broad range of shapes and sizes.

It is a further object of this invention to provide such an improved gripper system which is scalable as well to even larger and smaller size ranges.

It is a further object of this invention to provide such an improved gripper system which is lighter, stronger and less expensive.

It is a further object of this invention to provide such an improved gripper system with increased dexterity and able to perform in confined spaces.

It is a further object of this invention to provide such an improved gripper system which is able to perform in confined spaces without relying wholly on pitch axis rotation.

The invention results from the realization that a more universal, compliant gripper system, for use in a mobile robot, for example, which can grip objects over a wide size range can be achieved with a pair of jaws operable in a first plane and having a central closure axis, each jaw having a finger member and a finger tip member disposed at its distal end and a gripper drive assembly for moving the jaws toward and away from each other. Each finger member has a curved inner contour for accommodating an object to be gripped and each finger tip member includes an inner surface including an inner dihedral defining the sections which generally align with the curved inner contour for gripping a range of larger objects and an outer surface having an outer dihedral defining sections which generally align with the gripper central axis upon closure for gripping a range of smaller objects. A forcep element may extend from each finger tip member transversely to the first plane for gripping items.

The subject invention, however, in other embodiments, need not achieve all these objectives and the claims hereof should not be limited to structures or methods capable of achieving these objectives.

This invention features a gripper system including a pair of jaws operable in a first plane and having a central closure axis, each jaw including a finger member and finger tip member disposed on its distal end and a gripper drive assembly for moving the jaws toward and away from each other. Each finger member has a shaped inner contour for accommodating an object to be gripped; each finger tip member includes an inner surface which generally aligns with the shaped inner contour for gripping a range of larger objects and an outer surface which generally aligns with the gripper central closure axis upon closure for gripping a range of smaller objects.

In preferred embodiments the inner surface may include an inner dihedral defining sections which genially align with the shaped inner contour. The outer surface may include an outer dihedral defining sections which generally align with the gripper central axis. The inner surface may be curved. The outer surface may be curved. The inner contour may be curved. The inner contour may be a fair curve. The inner contour may be a circular arc. Each the finger member may include a pivot device for pivotably mounting the finger tip member to the associated finger member. Each inner surface may include an inner dihedral defining sections which generally align with the shaped inner contour and the pivot device may be disposed proximate the apex of the dihedral. Each jaw may include a stop mechanism for limiting rotation of each finger tip member about the pivot device. Each stop mechanism may include a fork device on one of the members and a stop device on the other. Each finger member may include a pair of spaced plates fastened together by a plurality of spacers. Each finger member and finger tip member may be fixed together. The gripper drive assembly may include a worm gear fixed to the proximal end of each jaw and a worm for rotating both worm gears. Each finger tip member may include a forcep element extending transversely to the first plane The invention also features a gripper system including a pair of jaws operable in a first plane and having a central closure axis, each jaw includes a finger member and finger tip member disposed on its distal end. There is a gripper drive assembly for moving the jaws toward and away from each other. Each finger tip member includes a forcep element extending transversely to the first plane.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
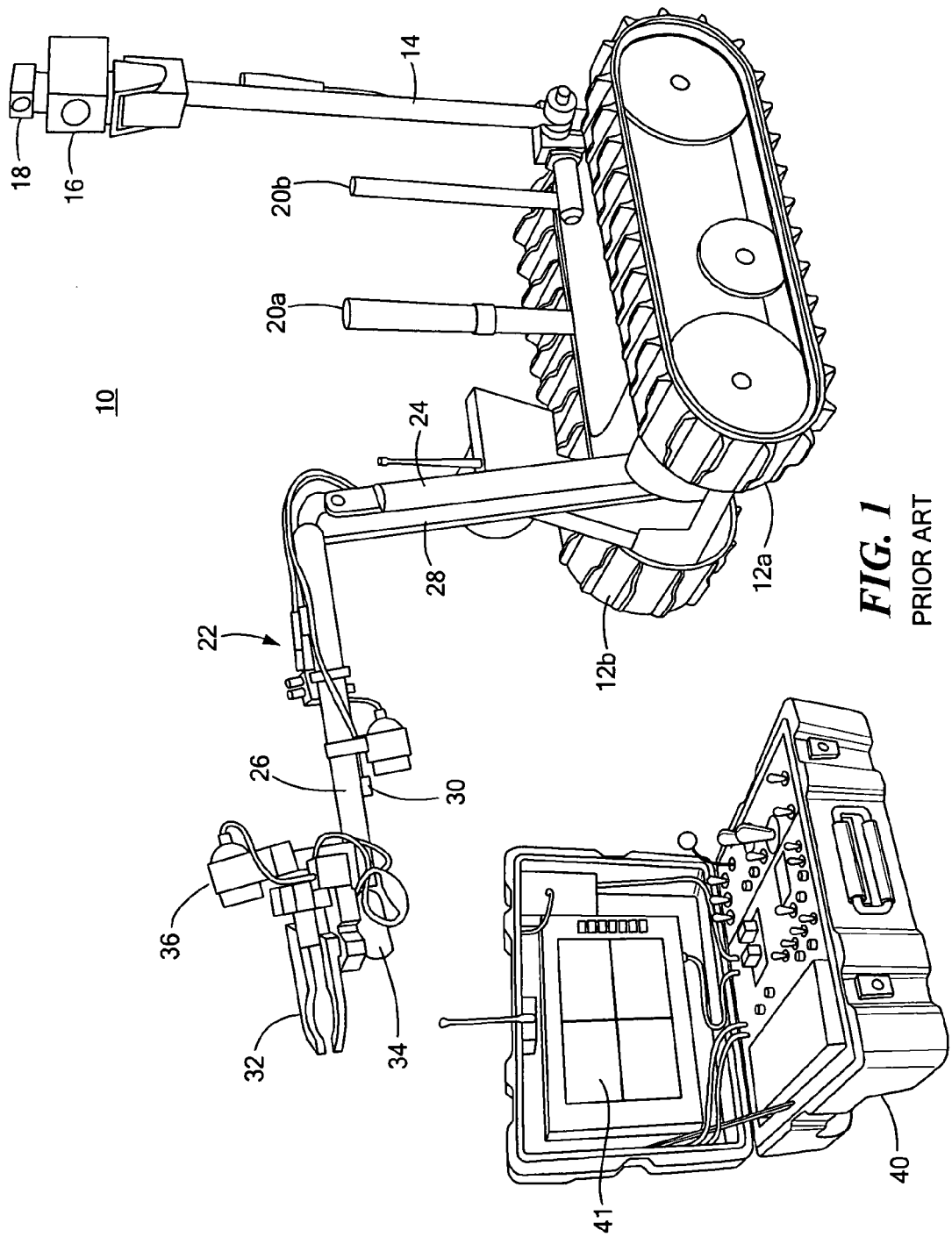
FIG. 1 is a schematic block diagram of a prior art mobile robot system having an end effector gripper on the end of an articulated arm.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

FIG. 1 shows a mobile, remotely controlled robot 10 driven by tracks 12a and 12b in accordance with one particular example of a robot in accordance with the subject invention. Robot 10 includes deployable mast 14, camera 16, light 18, antennas 20a and 20b, and arm assembly 22. Arm assembly 22 includes lower arm 24 and upper arm 26. Lower arm 24 is able to pitch up and down but it does not turn. Upper arm 26 pitches with respect to lower arm 24 and is driven by chain drive 28 extending along lower arm 24. Microphone 30 is on upper arm 26 as is end effector 32 which rotates via wrist 34. Camera 36 is typically aimed at end effector 32. Operator control unit 40 is used to wirelessly control robot 10 as is known in the art. The various images captured by the cameras of the robot may be displayed on view screen 41.

Figure 2:
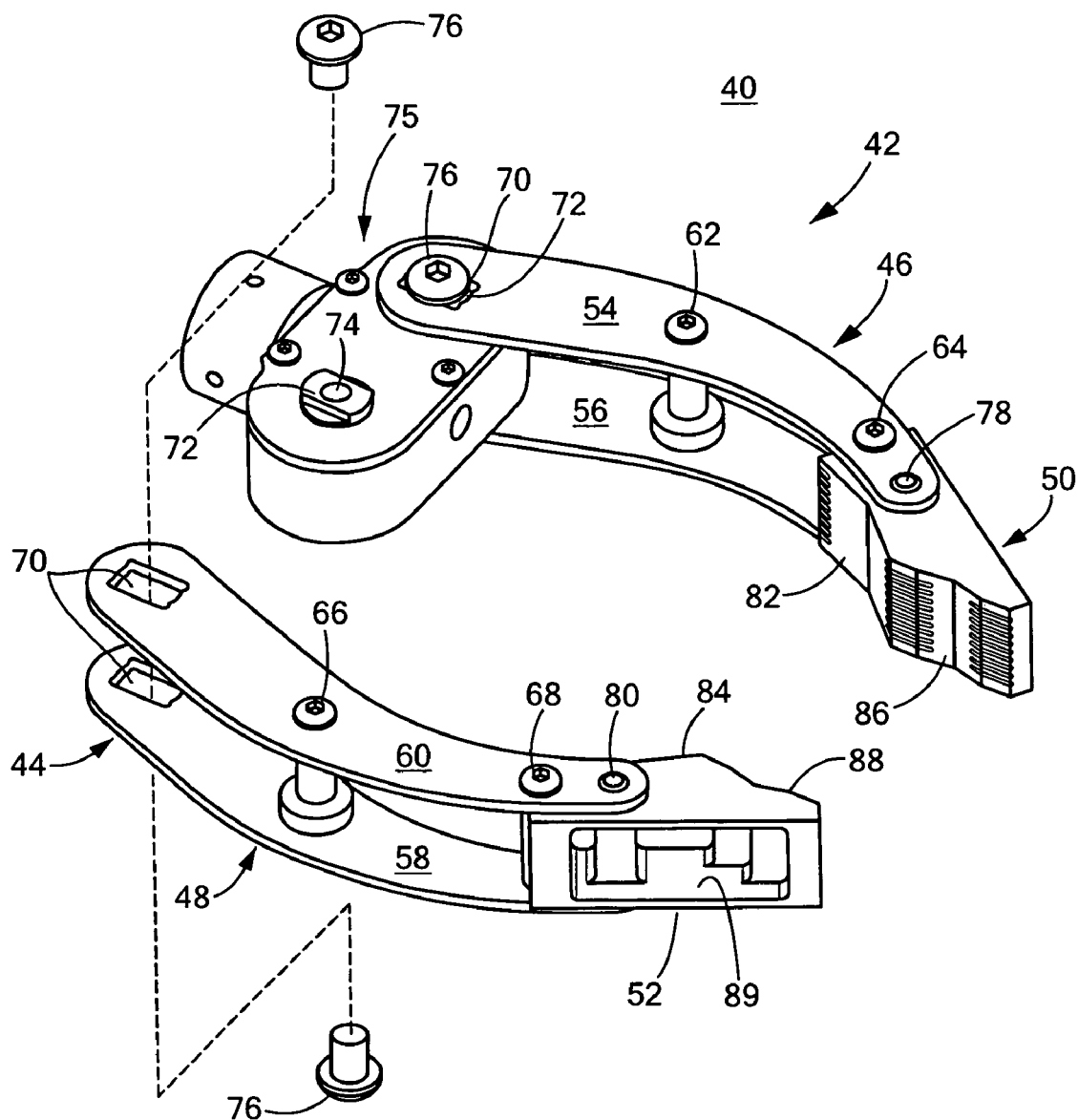
FIG. 2 is a three dimensional, partially exploded, diagrammatic view of a gripper system according to this invention.

End effector 32, FIG. 1, may be replaced by an improved gripper system according to this invention, such as gripper system 40, FIG. 2. Gripper system 40 includes two jaws 42, 44, each including a finger member, 46, 48, and fingertip member 50, 52, respectively. Each finger member 46, 48 is formed of a pair of spaced arms 54, 56, and 58, 60, respectively, which are spaced apart and fixed together by spacers 62, 64, and 66, 68, respectively. This makes finger members 46, 48, strong but extremely light. For further weight reduction finger tip members 50, 52 may have hollowed out portions as shown at 89 on finger tip member 52. At the proximal end of each arm 54, 56, 58 and 60 are rectangular holes 70 which engage with shouldered portions 72 of drive shafts 74 of gripper drive assembly 75 and may be held in place by screws 76. Each finger tip member 52 is fastened at pins 78, 80 to the distal ends of arms 54, 56 and 58 and 60, respectively. Each finger tip member has an inner surface 82, 84 and an outer surface 86 and 88.

Figure 3:
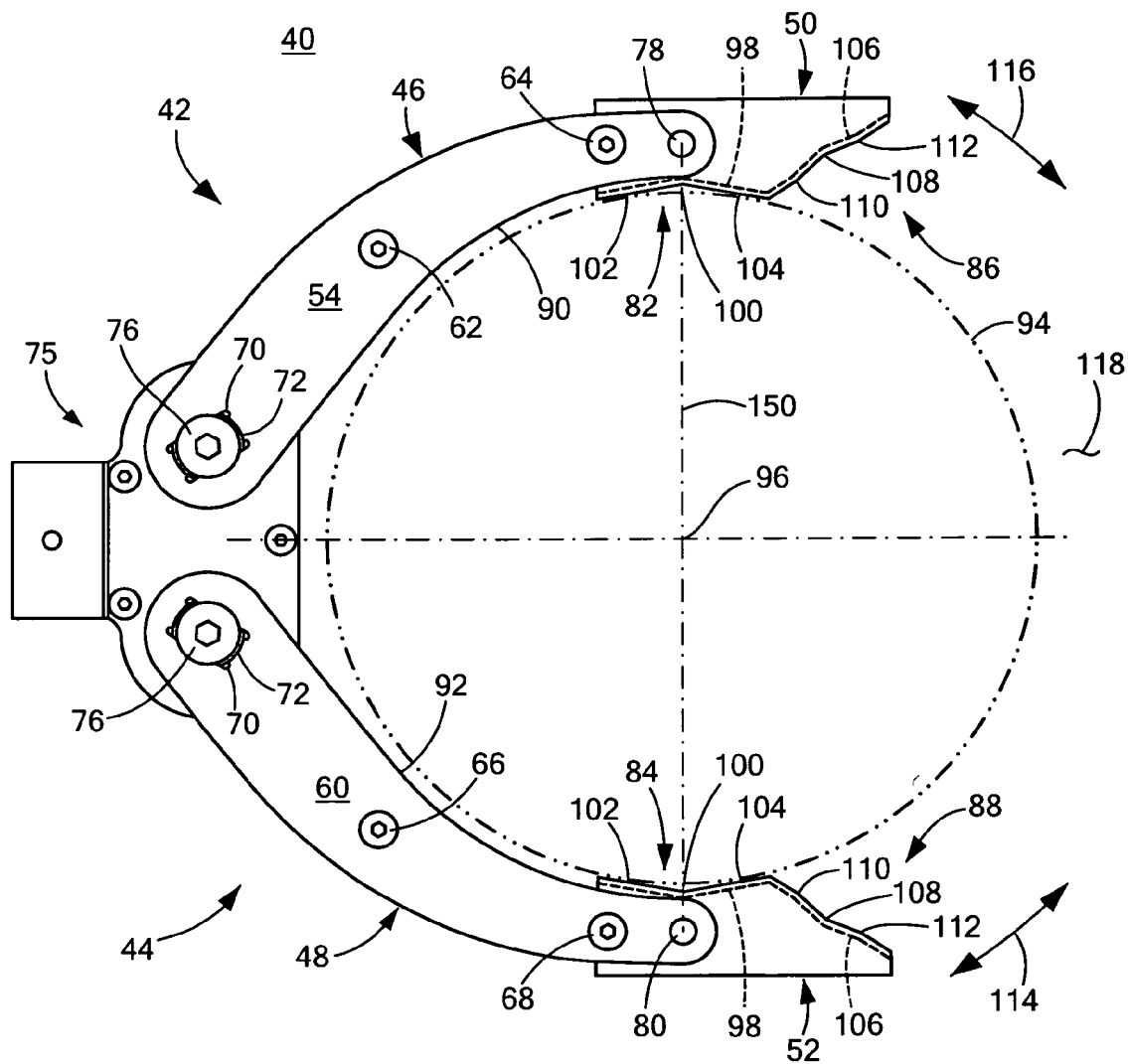
FIG. 3 is a top plan diagrammatic view of the gripper system of FIG. 2 in the filly open position.

Jaws 42 and 44, FIG. 3, have a shaped inner contour 90, 92 for accommodating an object to be gripped, such as object 94. Inner contours 90, 92 may be fair curves or other shapes or as shown in FIG. 3 they may be circular arcs centered at point 96 at the center of the largest object 94 sought to be gripped. Fingertip members 50, 52 may have their inner surfaces 82, 84 formed as a curved surface as shown in phantom at 98 or they may, for example, be a dihedral surface defined by dihedral angle 100 which defines two sections 102 and 104. Note that dihedral angles 100 may have their apices aligned with pivot pins 78, 80, which may be on a diameter 150 of center 96. Outer surfaces 86 and 88 may also be a curved surface as indicated at 106 or may also be a dihedral as indicated by dihedral angle 108 which defines dihedral sections 110 and 112. Gripper drive assembly 75 drives jaws 42, 44 to open and close in the directions indicated by arrows 114 and 116 in the plane of operation 118 which may be defined by the plane of the paper. Preferably whatever their shape inner surfaces 82, 84 generally track along with the shapes 90, 92 or are generally tangential to the object 94.

Figure 4:
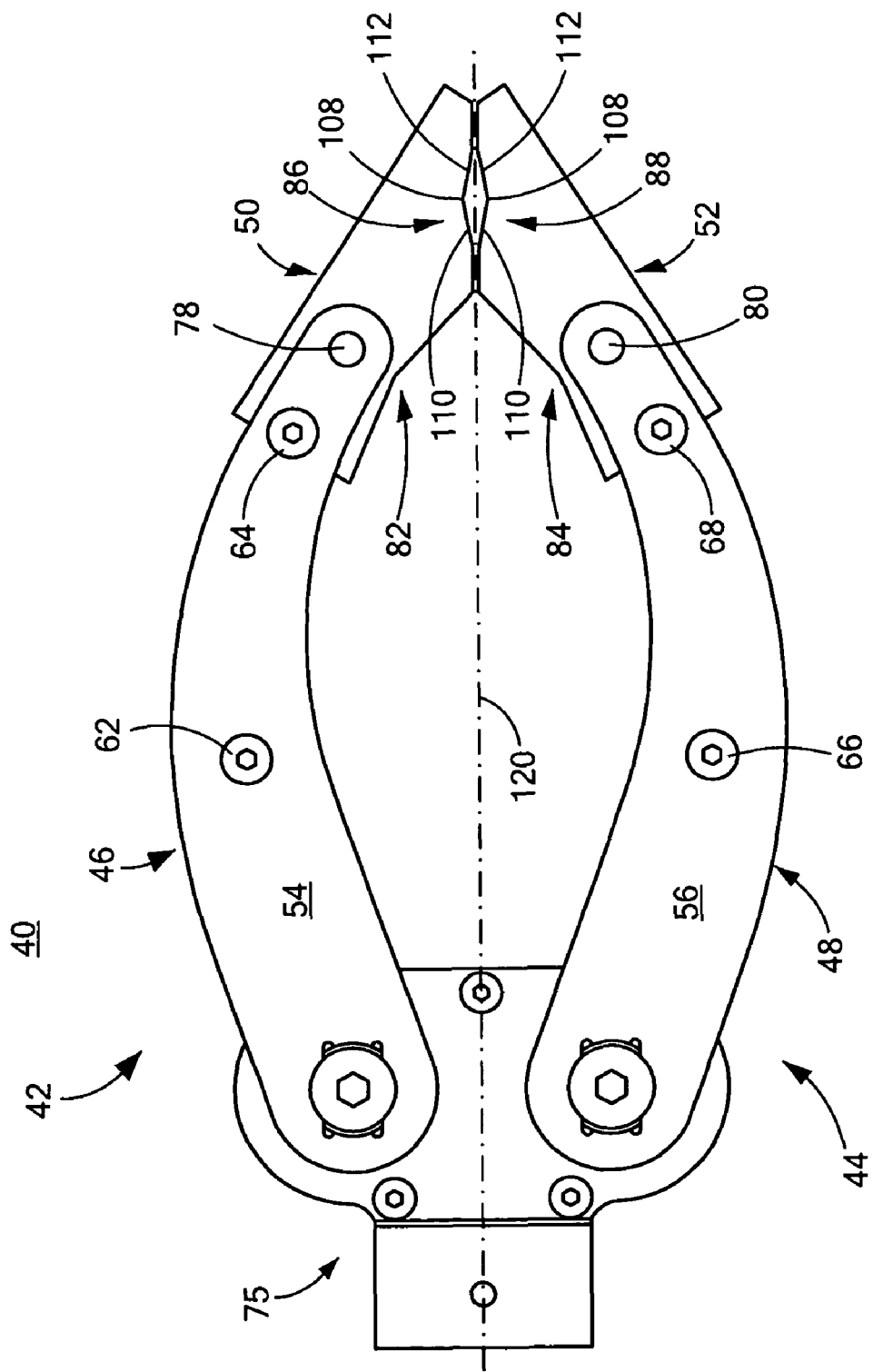
FIG. 4 is a top plan diagrammatic view of the gripper system of FIG. 2 in the fully closed position.

In FIG. 3 gripper system 40 has its jaws 42, 44 open for gripping at 66°. In contrast in FIG. 4, gripper system 40 has its jaws 42, 44 closed so that the outer surfaces 86 and 88 of finger tip members 50, 52 meet at the gripper central axis 120 illustrating the facility for gripping very small objects as well.

Figure 5:
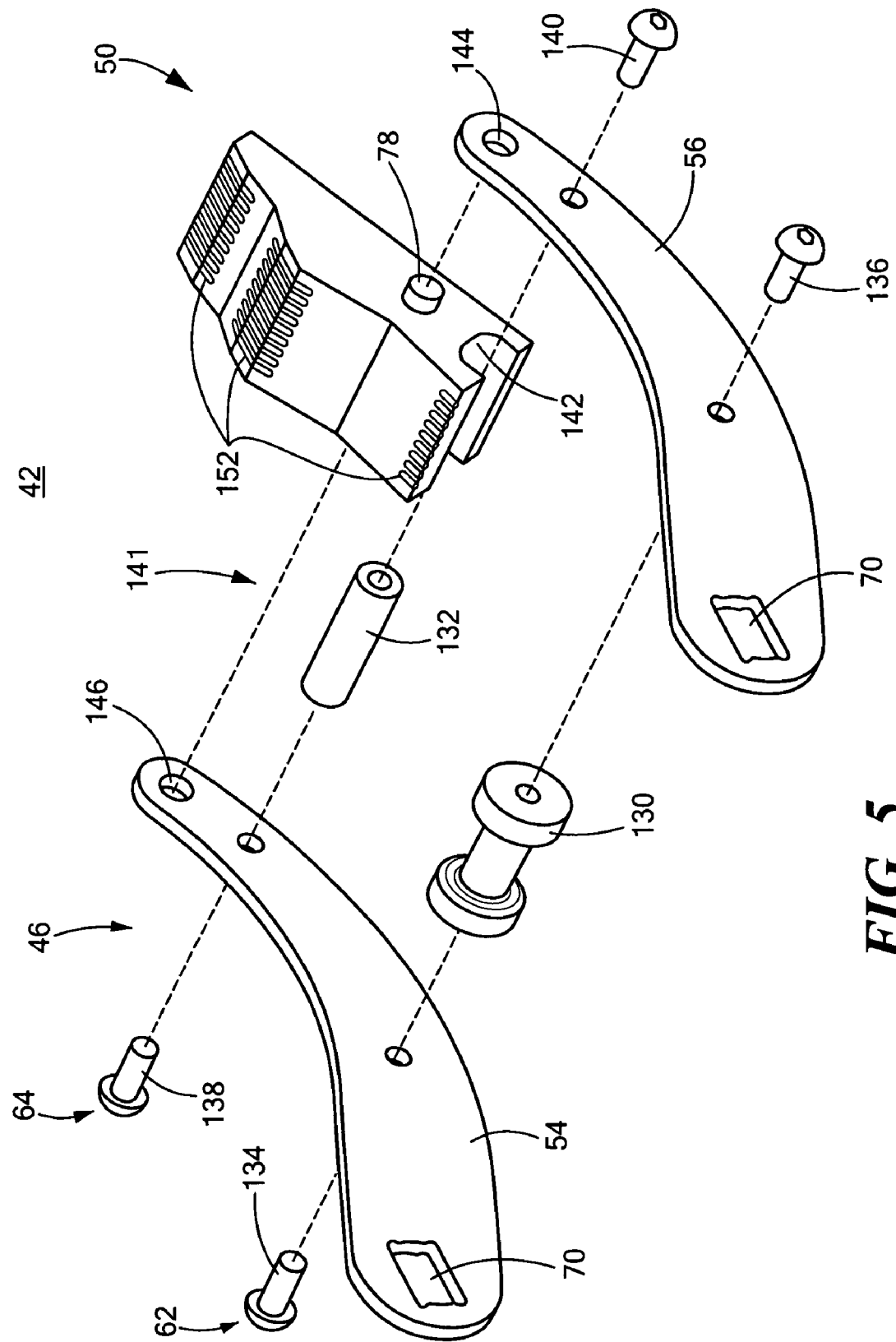
FIG. 5 is an exploded three dimensional view of one jaw of the gripper system of FIGS. 2-4.

FIG. 5 is an exploded view of jaw 42 including finger member 46 and finger tip member 50. The spacers 62 and 64 that hold arms 54 and 56 together actually include spacer sleeves 130, 132 and mounting screws 134, 136 and 138 and 140, respectively. A stop mechanism 141 may include spacer 132 slightly reduced in diameter and a recess 142 which is larger than the diameter of spacer member 132 and pin 78 may be a pivot pin, which pivots and holds 144 and 146 of arms 54 and 56, respectively. In this way, finger tip member 50 and finger tip member 52 as well may rock slightly to make a more universally compliant surface for gripping a range of large and small objects. Spacer 132 thus functions as a stop and recess 142 is in the nature of a fork. The positions of these items, stop and fork, could be switched so that the stop is on finger tip member 50, 52 and the fork on finger members 46, 48. Other implementations of stop mechanisms 141 may use other combinations. If it is desired that finger tip members 50, 52 be not pivotable then recess 142 and spacer bar member 132 will be closely dimensioned to prevent any rotation about pin 78. Pin 78 may be preferably located on a diameter 150, FIG. 3, of the largest object 94 anticipated for gripping but it need not be so positioned. Referring again to FIG. 5, the one or both finger tip members 50, 52 may be provided with serrations, or some sort of improved gripping surface as indicated at 152.

Figure 6:
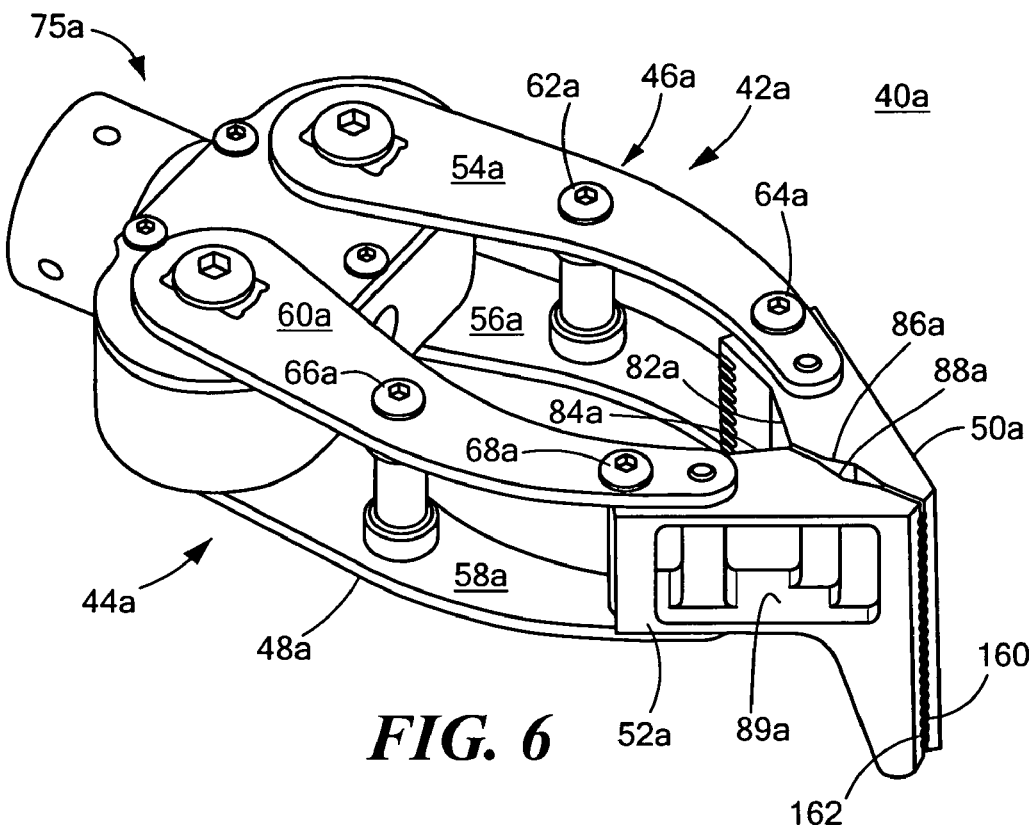
FIG. 6 is a three dimensional diagrammatic view of a gripper system in the fully closed position with finger tips having transverse forcep elements.
Figure 7:
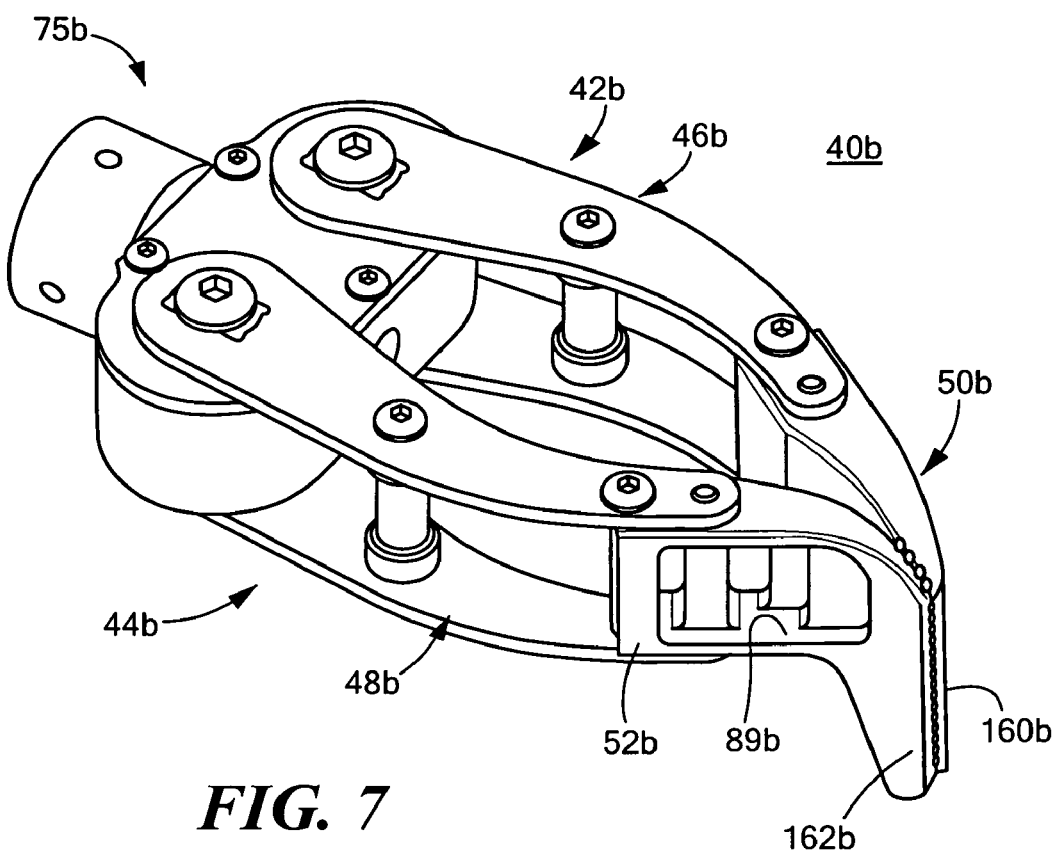
FIG. 7 is a is a three dimensional diagrammatic view of another embodiment of a gripper system in the filly closed position having transverse forcep elements.

At times it is necessary and desirable to use the finger tip members 50, 52 to dip into a confined space, for example, an electronic component housing to pull out a wire or two for clipping or other manipulation. Presently, in order to accomplish this either the entire upper arm 26 has to be moved in the pitch axis, FIG. 1, or perhaps gripper system 32 has to be moved in the pitch axis in order to accommodate such tasks. In order to avoid this the finger tip members 50a, 52a, may be provided with forcep elements 160, 162, FIG. 6, which extend transversely to the plane of operation, see plane 118, FIG. 3, to grip such items with a minimum of pitch rotation required. The forcep elements need not be accompanied by the inner surface and outer surface constructions as shown in FIG. 6, for as shown in FIG. 7 finger tip members 50b, 52b, may have forcep elements 160b, and 162b without those outer and inner surfaces shown in FIG. 6.

Figure 8:
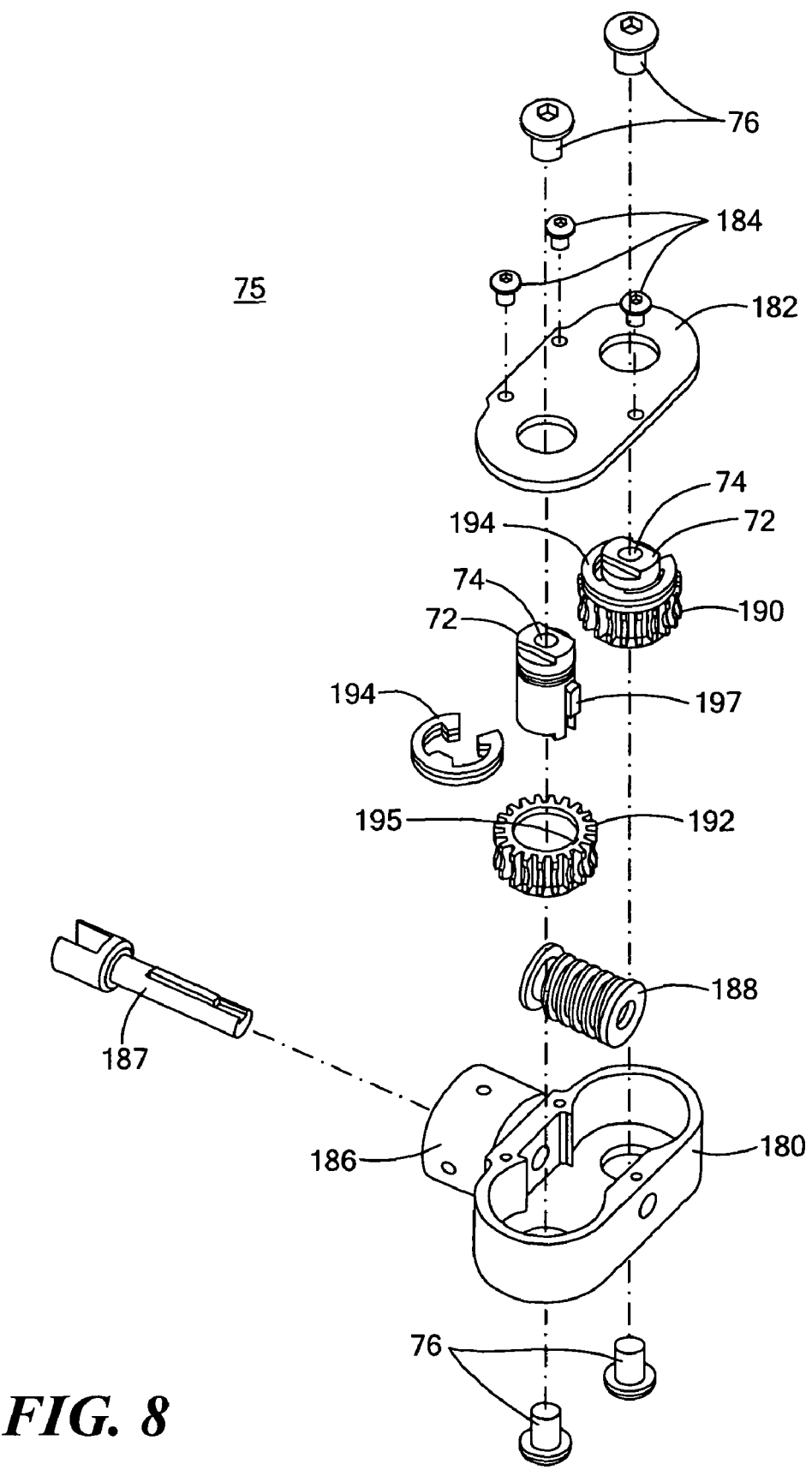
FIG. 8 is an exploded three dimensional view of the gripper device assembly of FIGS. 3, 4, 6 and 7.

Gripper drive assembly 75, FIG. 8, includes housing 180 with cover 182 secured by screws 184 and a collar 186. Worm drive shaft 187 passes through collar 186 to engage worm 188. Worm 188 drives worm gears 190, 192 which are held on shafts 74 by "C" rings 194 and keyed to rotate with shafts 74 by means of key ways 195 on worm gears 192, 194 which engage with keys 197 on shafts 74.

Figure 9A:
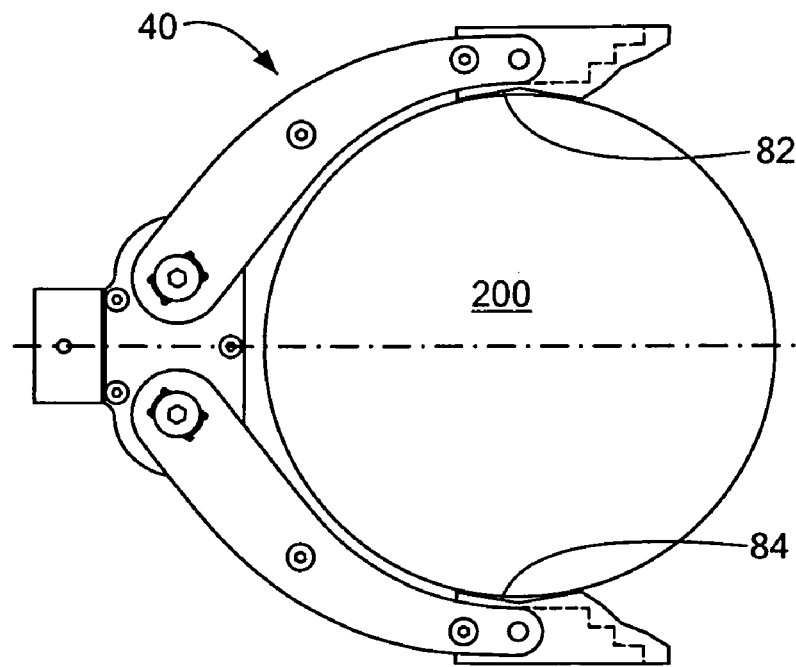
FIGS. 9A-F are a sequence of diagrammatic plan views showing the gripper system of this invention grasping a number of circular objects of decreasing size.
Figure 9B:
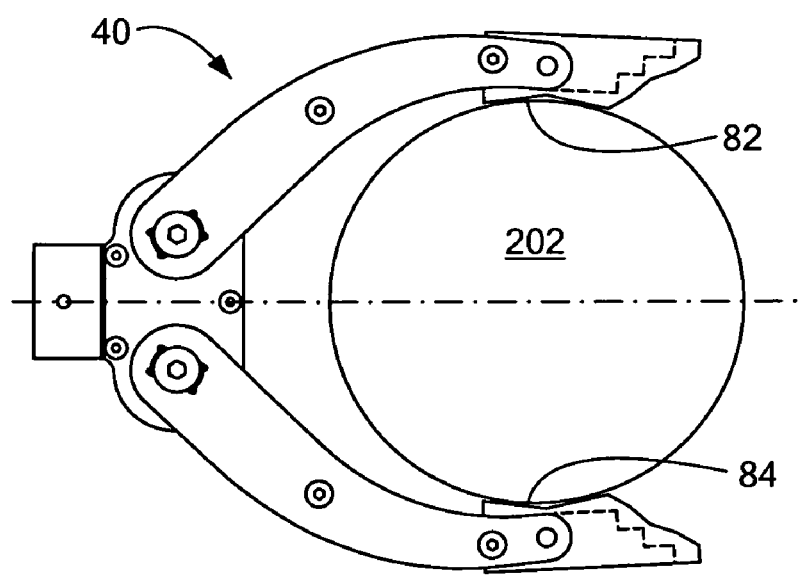
Figure 9D:
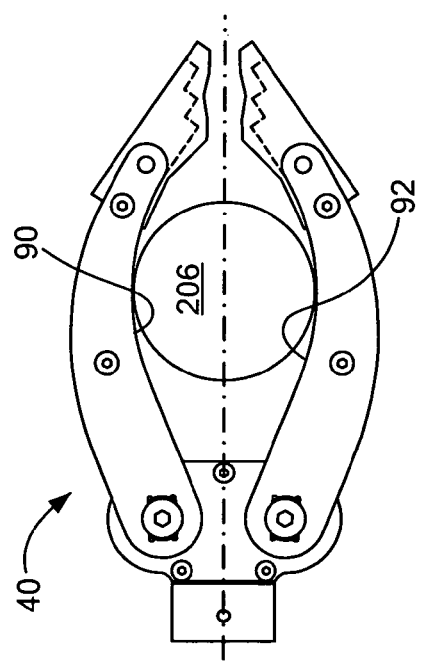
Figure 9F:
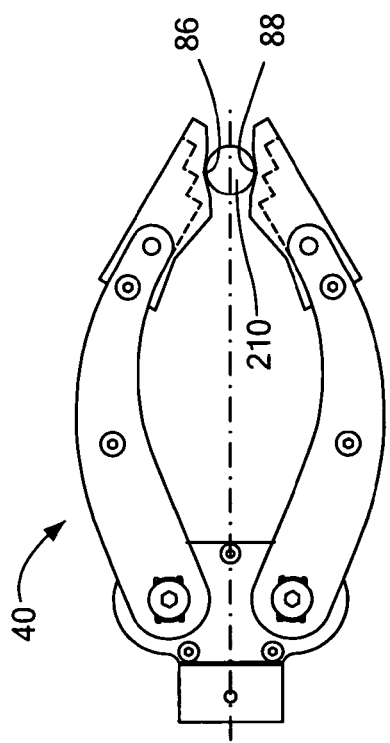
Figure 9C:
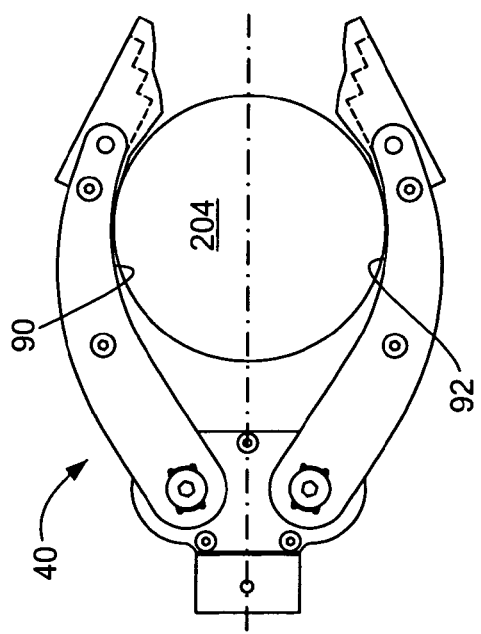
Figure 9E:
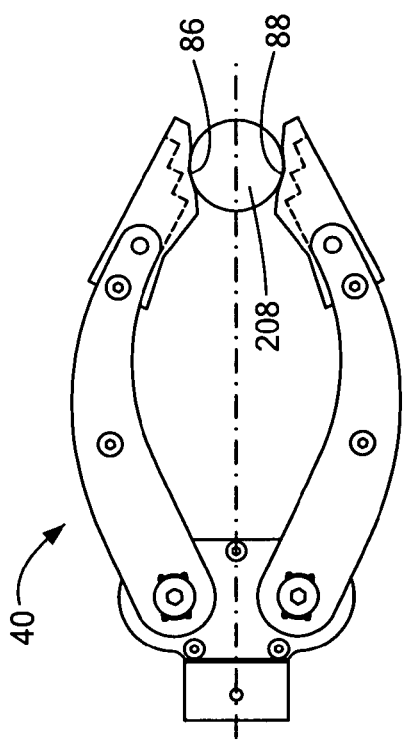
Figure 10A:
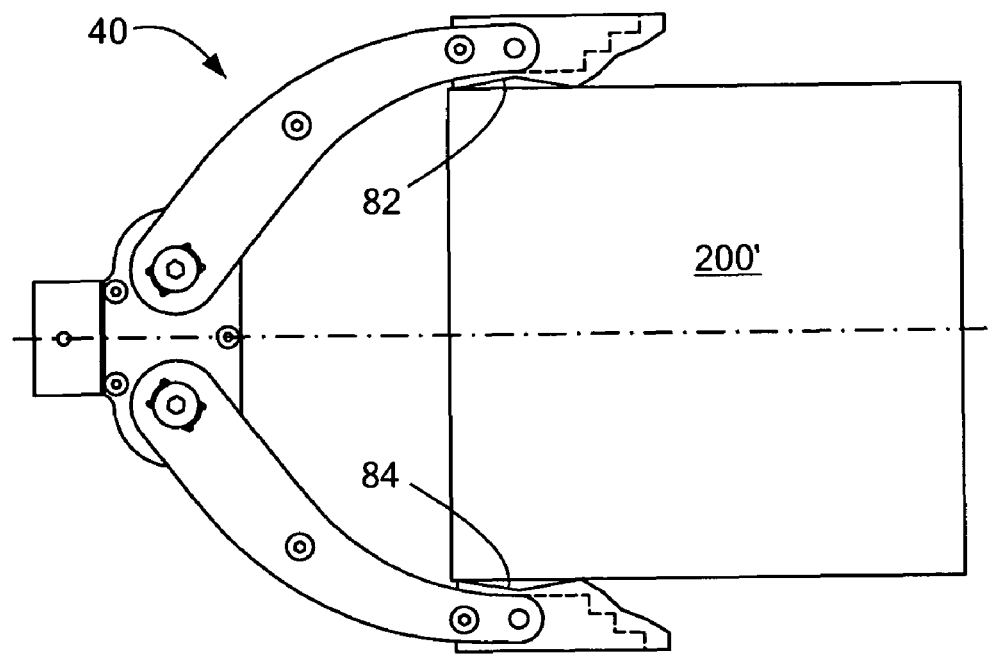
FIGS. 10A-F are a sequence of diagrammatic plan views showing the gripper system of this invention grasping a number of rectangular objects of decreasing size.
Figure 10B:
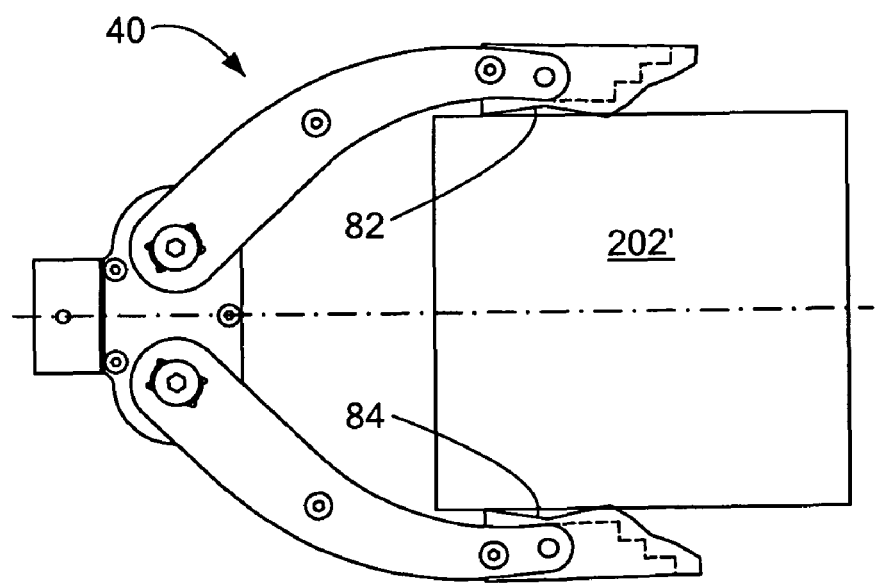
Figure 10C:
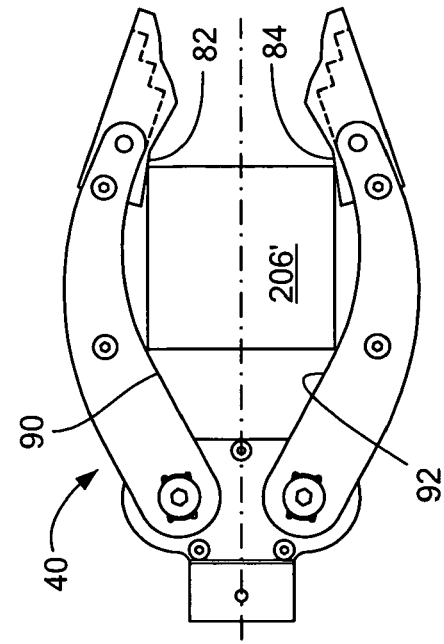
Figure 10D:
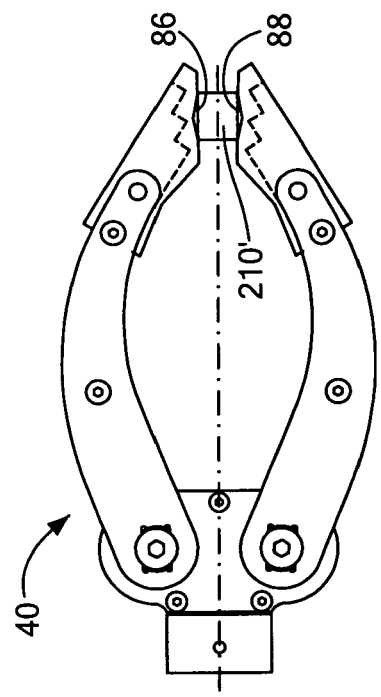
Figure 10E:
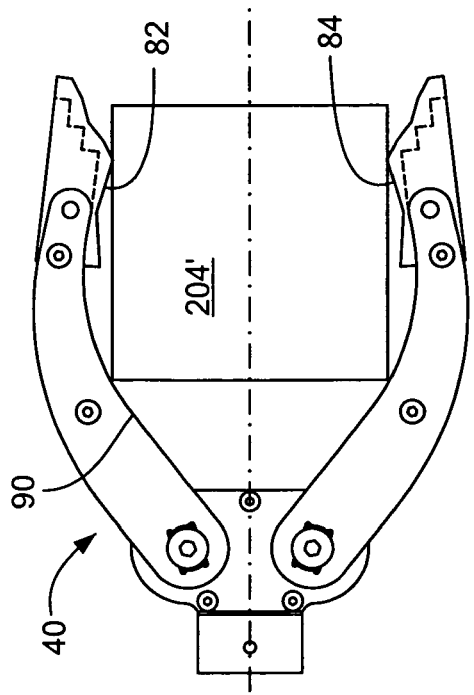
Figure 10F:
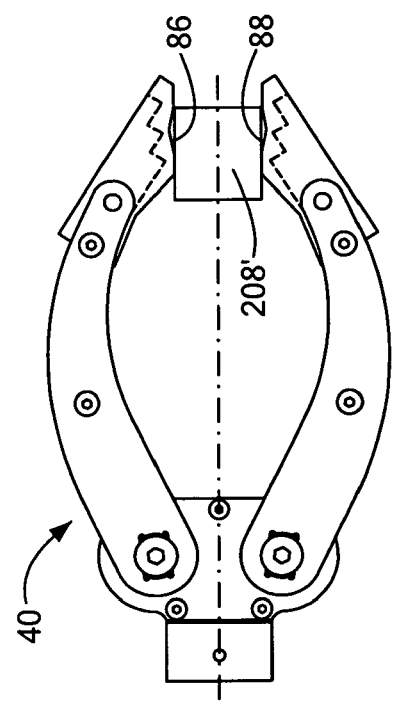

The facility of gripper system 40 according to this invention to grasp a large range of different size objects and different shaped objects is shown in FIGS. 9A-F and 10A-F. FIGS. 9A-F show a sequence of applications of gripper system 40 to smaller and smaller circular objects, starting with, for example, a five inch diameter circular object 200 and decreasing through four inch diameter object 202, three inch diameter object 204, two inch diameter object 206, one inch diameter object 208 and a half inch diameter 210. Note that in FIGS. 9A and 9B the object is gripped by the inner surfaces 82, 84. In FIGS. 9C and 9D the object is gripped by the inner contours 90, 92 and in FIGS. 9E and 9F the object is gripped by the outer surfaces 86, 88. When the object is a rectangular body, such as shown in FIGS. 10A-F the same transition from gripping with the inner surfaces 82, 84 in FIGS. 10A and 10B to the gripping by contours 90, and 92 but in conjunction with outer surfaces 82, and 84, in FIGS. 10C and 10D, and with the outer surfaces 86, 88 in FIGS. 10E and 10F. In this way the improved gripper system according to this invention accommodates not only objects of a wide variety of sizes but also of many different shapes.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A gripper system comprising:
a pair of jaws operable in a first plane and having a central closure axis, each jaw including a finger member and finger tip member disposed on its distal end; and
a gripper drive assembly for moving said jaws toward and away from each other;
each finger member having a shaped inner contour for accommodating an object to be gripped, each finger tip member including a concave inner surface having angled sections which generally aligns with said shaped inner contour when gripping objects, said inner surface for gripping a range of larger objects and followed by a concave outer surface extending outwardly from the inner concave surface and also having angled sections which generally align with the gripper central closure axis upon closure for gripping a range of smaller objects.

2. The gripper system of claim 1 in which said inner surface includes an inner dihedral defining said angled sections which generally align with said shaped inner contour.

3. The gripper system of claim 1 in which said outer surface includes an outer dihedral defining said angled sections which generally align with the gripper central axis.

4. The gripper system of claim 1 in which said inner contour is curved.

5. The gripper system of claim 1 in which said inner contour is a fair curve.

6. The gripper system of claim 1 in which said inner contour is a circular arc.

7. The gripper system of claim 1 in which each said finger member includes a pivot device for pivotably mounting the finger tip member to the associated finger member.

8. The gripper system of claim 7 in which said each said inner surface includes an inner dihedral defining sections which generally align with said shaped inner contour and said pivot device is disposed proximate the apex of the dihedral.

9. The gripper system of claim 7 in which each said jaw includes a stop mechanism for limiting rotation of each said finger tip member about said pivot device.

10. The gripper system of claim 9 in which each said stop mechanism includes a fork device on one of said members and a stop device on the other.

11. The gripper system of claim 1 in which each said finger member includes a pair of spaced plates fastened together by a plurality of spacers.

12. The gripper system of claim 1 in which each said finger member and finger tip member are fixed together.

13. The gripper system of claim 1 in which said gripper drive assembly includes a worm gear fixed to the proximal end of each said jaw and a worm for rotating both said worm gears.

14. The gripper system of claim 1 in which each said finger tip member includes a forcep element extending transversely to said first plane.

15. A gripper system comprising:
a pair of jaws operable in a first plane and having a central closure axis; each jaw including a finger member and finger tip member disposed on its distal end; and
a gripper drive assembly for moving said jaws toward and away from each other;
each finger member having a shaped inner contour for accommodating an object to be gripped; each finger tip member including an inner surface which includes an inner dihedral defining sections which generally align with said shaped inner contour for gripping a range of larger objects and an outer surface which generally aligns with the gripper central closure axis upon closure for gripping a range of smaller objects; and
a pivot device for pivotably mounting the finger tip member to the associated finger member, said pivot device disposed proximate the apex of the dihedral.

16. A gripper system comprising:
a pair of jaws operable in a first plane and having a central closure axis;
each jaw including a finger member and a fingertip member disposed on its distal end;
a gripper device for moving said jaws toward and away from each other;
each finger member having a shaped inner contour for accommodating an object to be gripped;

each fingertip member including an inner surface with an inner dihedral defining angled sections which generally align with said shaped inner contour for gripping larger objects; and each fingertip member also including an outer surface also having angled sections which generally align with the central closure axis upon closure of the jaws for gripping smaller objects.

17. A gripper system comprising:

a pair of jaws operable in a first plane and having a central closure axis;

each jaw including a finger member and a fingertip member disposed on its distal end;

a gripper device for moving said jaws toward and away from each other;

each finger member having a shaped inner contour for accommodating an object to be gripped;

each fingertip member including an inner surface defining angled sections which generally align with said shaped inner contour for gripping larger objects; and each fingertip member also having an outer surface including an outer dihedral defining angled sections which generally align with the central closure axis upon closure of the jaws for gripping smaller objects.

18. A gripper system comprising:

a pair of jaws operable in a first plane and having a central closure axis;

each jaw including a finger member and a fingertip member disposed on its distal end;

a pivot device pivotably mounting the fingertip member to the finger member;

a gripper device for moving said jaws toward and away from each other;

each finger member having a shaped inner contour for accommodating an object to be gripped;

each fingertip member having an inner surface including an inner dihedral defining angled sections which generally align with said shaped inner contour to grip larger objects;

the pivoting device located at the apex of the dihedral; and each fingertip member also including an outer surface with angled sections which generally align with the central closure axis upon closure of the jaws for gripping smaller objects.

19. A gripper system comprising:

a pair of jaws operable in a first plane and having a central closure axis;

each jaw including a finger member and a fixed fingertip member disposed on its distal end;

a gripper device for moving said jaws toward and away from each other;

each finger member having a shaped inner contour for accommodating an object to be gripped;

each fingertip member including an inner surface defining angled sections which generally align with said shaped inner contour for gripping larger objects; and each fingertip member also including an outer surface with angled sections which generally align with the central closure axis upon closure of the jaws for gripping smaller objects.

* * * * *